(12) United States Patent
Kainthla et al.

(10) Patent No.: US 6,953,639 B2
(45) Date of Patent: Oct. 11, 2005

(54) HEAVY METAL-FREE RECHARGEABLE ZINC NEGATIVE ELECTRODE FOR AN ALKALINE STORAGE CELL

(75) Inventors: Ramesh C. Kainthla, College Station, TX (US); David J. Manko, Bryan, TX (US); Charles Sesock, College Station, TX (US)

(73) Assignee: Rechargeable Battery Corporation, College Station, TX (US)

(*) Notice: Subject to any disclaimer, the term of this patent is extended or adjusted under 35 U.S.C. 154(b) by 248 days.

(21) Appl. No.: 10/390,560

(22) Filed: Mar. 17, 2003

(65) Prior Publication Data

US 2004/0185329 A1 Sep. 23, 2004

(51) Int. Cl.$^7$ .............................. H01M 4/42; H01M 4/48
(52) U.S. Cl. ....................................... 429/231; 429/229
(58) Field of Search .................................. 429/229–231

(56) References Cited

U.S. PATENT DOCUMENTS

| | | | | | |
|---|---|---|---|---|---|
| 5,460,899 A | * | 10/1995 | Charkey | ....................... | 429/59 |
| 5,541,021 A | * | 7/1996 | Watanabe et al. | ............ | 429/206 |

FOREIGN PATENT DOCUMENTS

JP          59-151776      *  8/1984    ..........  H01M/10/34

* cited by examiner

Primary Examiner—Mark Ruthkosky
(74) Attorney, Agent, or Firm—Factor & Lake

(57) ABSTRACT

A heavy metal-free rechargeable Zinc electrode for use in storage cells having alkaline electrolyte has been developed. The electrode includes a current collector and an active mass based on metallic zinc and zinc oxide powders, calcium hydroxide, indium hydroxide, indium sulfate, bismuth-oxide and a binder. The electrodes have been successfully used in Ni—Zn and Ag—Zn cells. The electrodes lead to environmentally benign alkaline cells. The electrodes have additional advantages over the prior art electrodes in terms of initial capacity and cyclability.

14 Claims, 5 Drawing Sheets

HEAVY METAL-FREE RECHARGEABLE ZINC NEGATIVE ELECTRODE FOR AN ALKALINE STORAGE CELL

FEDERALLY SPONSORED RESEARCH

This invention was made with United States Government support under contract number 70NANB9H3031, awarded by the National Institute of Standards and Technology (NIST).

BACKGROUND OF THE INVENTION

1. Field of the Invention

The present invention relates to a rechargeable zinc electrode used as a negative electrode in a storage cell having an alkaline electrolyte, and specifically to Nickel-Zinc and Silver-Zinc cells.

2. Background Art

Rechargeable cells such as, for example, Nickel/Zinc, Silver/Zinc, Zinc/Air and Manganese-dioxide/Zinc, containing zinc electrodes are of significant interest due to the abundance and, therefore, low cost of zinc, as well as low equivalent weight, high coulombic efficiency, reversible electrochemical behavior, and reduced environmental disposal problems (e.g., in comparison to lead or cadmium).

The electrode potential of the zinc electrode in alkaline solutions is such that the electrode corrodes due to hydrogen evolution and conversion of zinc to zinc oxide. This leads to high self discharge of the cell, cell leakage due to pressure build-up inside the cell and poor performance of the cells. To reduce the corrosion and hydrogen evolution, several materials (for example HgO, PbO, $SnO_2$, $Tl_2O_3$, CdO, $In(OH)_3$, $Ga_2O_3$ and combinations thereof) have been added to the zinc electrode.

Until the 1970's the additive of choice had been HgO, which is excellent at suppressing hydrogen evolution. However, HgO is toxic, costly to dispose of and has come under increasing regulatory pressure. These issues created an increased concern which inspired the researchers and manufacturers to find a suitable substitute for HgO. As a result, all toxic materials (e.g., HgO, PbO, CdO etc.) have been completely removed from gelled Zinc electrodes used in primary $MnO_2/Zn$ alkaline cells. Unfortunately, because of the requirements of rechargeability, these compositions can not be used directly in rechargeable electrodes. Consequently, the rechargeable zinc electrode, still contain some toxic ingredients, as exemplified below.

Many inventors have reported different compositions for the rechargeable Zinc electrodes. The composition typically has Zn-oxide as the major component, a metal oxide (such as Lead oxide, cadmium oxide, bismuth oxide) as hydrogen suppressant, and a binder (polystyrene, methyl cellulose, polytetrafluoroethylene (Teflon), polyvinylalcohol, Cellulose, etc.). Himy et al. [A. Himy & O. C. Wagner, U.S. Pat. No. 4,327,157 dt. Apr. 27, 1982] describe a rechargeable Zinc electrode containing a corrosion inhibitor such as PbO, $SnO_2$, $Tl_2O_3$, $In(OH)_3$, or mixtures thereof (All described compositions contain various amounts of PbO and another compound). Adler et al. [T. C. Adler, F. R. McLarnon and E. J. Cairns, Journal of the Electrochemical Society, Vol. 140, p. 289 (February 1993)] describe an electrode containing 94% Zinc-oxide, 2% Lead oxide, 1% newsprint and 4% Teflon as binder. Jones [U.S. Pat. No. 4,358,517, dated Nov. 9, 1982] describes a zinc electrode containing 0.25 to about 1.5 moles of Calcium hydroxide per mole of Zinc oxide (active ingredient), lead oxide (hydrogen suppressant) content up to about 4% by weight of the mixture, and cellulose (as binder) of about 0.5% to about 10% by weight of the mixture. Charkey [U.S. Pat. No. 5,460,899 dated Oct. 24, 1995] describes a zinc electrode with 5–20% of metal (Pb, Bi, Cd, Ga or Tl) oxide, 15–40% Calcium hydroxide, 5% Teflon as binder and rest Zinc oxide as active component. Serenyi [U.S. Pat. No. 5,773,176 dated Jun. 30, 1998] describes an electrode containing bismuth-oxide and other additives e.g., lead oxide and cadmium oxide with zinc oxide. Coonan et. al. [E. W. Coonan, P. D. Frayer, R. J. Monahan & K. A. Wexell, U.S. Pat. No. 6,284,192 dated Sep. 4, 2001] describe a zinc electrode containing 8% lead oxide. Thus, most of the rechargeable zinc formulations still contain lead and/or cadmium oxide, both of which are toxic materials. Therefore, there is a need for a formulation for rechargeable zinc electrode which is free of toxic materials. It is essential that the electrode performance be at least as good as the performance of prior arts electrodes containing lead and or cadmium The main objective of the invention is to make a zinc electrode free of any toxic materials. Another objective of the invention is to obtain a performance better than any other prior art zinc electrode.

These and other objectives of the invention will become apparent in light of the present specification, claims, and drawings.

SUMMARY OF THE INVENTION

Figure 1:
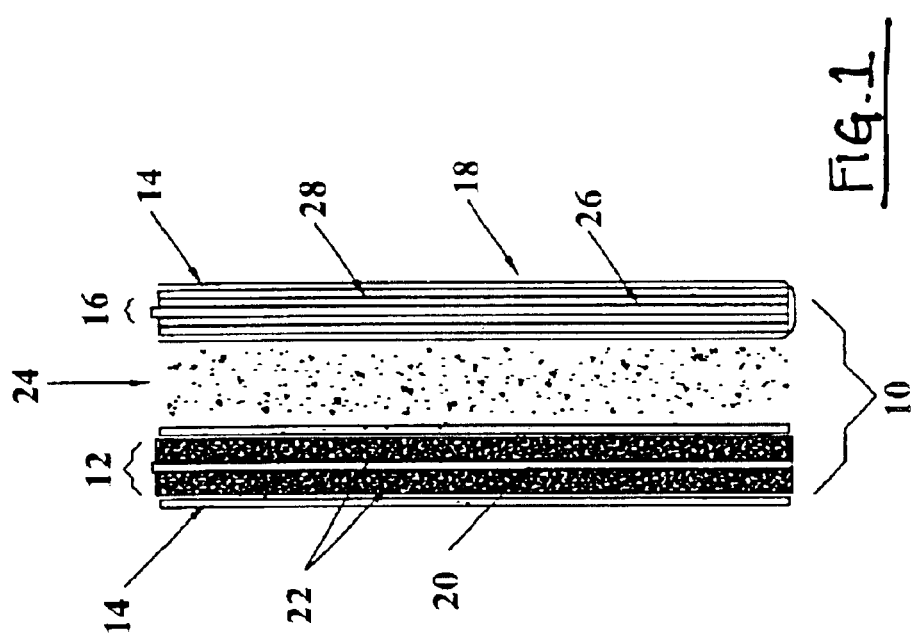
FIG. 1 of the drawings is a schematic representation of an alkaline electrochemical cell fabricated in accordance with the present invention.

The present invention is directed to a toxic material free rechargeable anodic zinc electrode for use in an alkaline based electrochemical cell comprising: (a) a current collector; (b) an active material composition applied to the current collector, wherein the active material composition includes Zn and ZnO, and (c) a hydrogen gas and corrosion suppressant comprising of $In(OH)_3$, $In_2(SO_4)_3$ and $Bi_2O_3$.

In another preferred embodiment of the present invention, the anodic zinc electrode further comprises a zincate solubility modifier selected from the group consisting of $Ca(OH)_2$, $Ba(OH)_2$ and $Sr(OH)_2$, and mixtures thereof In yet another preferred embodiment of the present invention, the anodic zinc electrode further comprises a binding agent selected from the group consisting of CMC, PTFE, PVA, Kraton and mixtures thereof.

The present invention is also directed to an electrochemical cell comprising: (a) a cathode; (b) an alkaline electrolyte; (c) separator and absorber and (d) an anodic rechargeable zinc electrode comprising: (1) a current collector; and (2) an active material composition applied to the current collector, wherein the active material composition includes Zn and ZnO and hydrogen/corrosion suppressant $In(OH)_3$, $In_2(SO_4)_3$ and $Bi_2O_3$.

In accordance with the present invention a method for manufacturing an anodic rechargeable zinc electrode for use in alkaline based electrochemical cell is disclosed which comprises the steps of (a) providing a current collector, (b) providing an active material composition, wherein the active material composition includes Zn and ZnO and hydrogen/corrosion suppressant $In(OH)_3$, $In_2(SO_4)_3$ and $Bi_2O_3$; and (c) associating the active material composition with the current collector.

It has been observed that the rechargeable zinc electrode with theses ingredients is not only a non-toxic material but, when used in a Ni—Zn cell, yields higher initial capacity and increased cycle life, The rechargeable zinc electrode of the present invention can also be used in other alkaline rechargeable batteries, e.g., Silver-Zinc batteries and zinc-air batteries.

During experimental work leading to the invention, several 5Ah Ni—Zn cells were assembled with heavy metal-free rechargeable Zinc electrodes of the present invention and rechargeable Zinc electrodes containing lead oxide, It was observed that the cells with present invention outperformed the cells with lead oxide containing anodes.

DETAILED DESCRIPTION OF THE INVENTION

While this invention is susceptible of embodiment in many different forms, there is shown in the drawings and will be described in detail, specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings, and to FIG. 1 in particular, a schematic representation of a first embodiment of an electrochemical cell 10 is shown as generally comprising: zinc based anodic electrode 12, separated by an absorber 14, and separator 18, containing electrolyte 24, from cathodic electrode 16. It will be understood that FIG. 1 is merely a schematic representation of electrochemical cell 10. As such, some of the components may be distorted from their actual scale for pictorial clarity.

Zinc-based anodic electrode 12 includes current collector 20 and active material 22. For purposes of the present disclosure, current collector 20 is fabricated from copper. It will be understood, however, that current collector 20 may be fabricated from any one of a number of other conductive materials known to those with ordinary skill in the art having the present disclosure before them. Current collector 20 may comprise perforated metal, non-perforated metal, mesh, expanded metal, and combinations thereof Active material 22 includes active materials zinc (Zn) and zinc oxide (ZnO) powders and hydrogen/corrosion suppressant $In(OH)_3$, $In_2(SO_4)_3$ and $Bi_2O_3$.

Active material 22 may also include zincate solubility modifiers such as $Ca(OH)_2$, $Sr(OH)_2$, $Ba(OH)_2$ and mixtures thereof.

In accordance with the present invention active material 22 may also include binding agents or binders such as carboxy-methyl cellulose (hereinafter "CMC"), poly-tetra fluoro ethylene (hereinafter "PTFE"), poly vinyl alcohol (hereinafter "PVA"), and mixtures thereof Electrolyte 24 is preferably an aqueous solution of KOH, LiOH, and/or NaOH.

Cathodic electrode 16 may be fabricated from a conventional cathodic electrode material, such as sintered nickel, or, alternatively may be fabricated from a conventional cathodic current collector including nickel foam 26 and active material 28, such as a conventional manganese dioxide, Nickel-hydroxide and silver-oxide paste compositions. While specific examples of cathodic electrode materials have been disclosed, it will be understood that numerous other cathodic electrode materials are likewise suitable for use in accordance with the present invention.

Electrode Manufacture

Zinc electrodes made in accordance with the present invention are made from zinc powder (Zn), zinc oxide powder (ZnO), calcium hydroxide ($Ca(OH)_2$), indium hydroxide ($In(OH)_3$), indium sulfate ($In_2(SO_4)_3$) and bismuth oxide ($Bi_2O_3$), and PTFE. Preferably, the electrodes are made by first dry mixing the zinc, zinc-oxide, calcium hydroxide, indium hydroxide, indium sulfate, bismuth oxide and PTFE. To the dry mixed material, a measured quantity of an organic lubricant is added, followed by more mixing. The moist mixture is pressed into a cake. The cake is passed through a set of rotating rollers with an appropriate gap. The material is passed till it starts to come together and forms a continuous thick sheet. After this, the distance between the rollers is reduced in multiple steps to the desired thickness with material passed through at each gap to reduce the thickness of the sheet. Once a sheet of desired thickness is formed, it is air dried and ready to be cut into proper size pieces. The appropriate size pieces are cut using cutting dies. To make a full electrode two pieces (one on each side) are laminated to a copper current collector with a lead attached to it, and to make a half electrode only one piece is attached to one side. The piece/s can be attached to the current collector using a pressing die in a press or by passing them through a set of rotating rollers with a desired gap. The current collector can be a copper mesh, expanded, perforated or pierced sheet. The lead can be a wire or set of copper wires, or copper tabs.

The above example serves as just one method of manufacturing the electrodes of present invention. They can also be made using other techniques such as extruding the material into sheets and pressing the sheets on to the current collector, pressing powder on to the current collector, and pasting the mixture on to the current collector.

The invention will be better understood and other advantages and features thereof will appear on reading the following examples given by way of non-limiting) illustrations. As will be shown in more detail below, cells formed using the materials discussed herein, using known methods of manufacture and formation, produce cells having the same or better charging/discharging/cycling performance, while eliminating the need for toxic materials as in prior art cells.

EXAMPLE 1

305 gms of zinc powder, 525 gms of zinc-oxide, 120 gms of Calcium-hydroxide, 1 gm of indium hydroxide, 1.5 gms of indium sulphate, 22.5 gms of bismuth-oxide and 25 gms of PTFE 6C powder were dry mixed for 5 minutes. 300 ml of organic lubricant (shell sol) was added to the mixture with continuous mixing at the rate of 15 ml/min. The moist mixture was pressed to yield a cake. The cake was passed through a set of rotating rollers, till the material started to form a continuous sheet. The gap between the roller was slowly reduced to 0.635 mm. With this gap the thickness of the sheet/s was 0.80 mm. The sheet/s was air dried. The sheet did not tear easily and had a good physical integrity.

Expanded copper current collectors with copper tabs were cut into 73.025 mm×48.25 mm pieces. To make full electrodes two pieces of the material were pressed on to the current collector using pressing dies, at 25,000 psi for 2 minutes. Absorber (Freudenberg absorber FS2119) was placed between the material and the die to prevent the material from sticking to the die. To make half electrode, only one piece was attached to the current collector at the same pressure and for same time. Part of the material gets embedded in to the open spaces of the expanded metal leading to a very good adhesion of the material to the current collector. The final thickness of the full electrode was 0.73 mm while that of the half electrode was 0.48 mm. The electrodes were used in a Ni—Zn storage cell.

Sintered Nickel electrodes were cut in to 73.025 mm×48.25 mm pieces. A Nickel tab of 0.5 mm thickness was spot welded onto the top of the electrode. The electrodes were wrapped in one layer of Freudenberg absorber FS2119 and heat sealed in two layers of SciMat 31/08 separator with the top open. Five Nickel electrodes, four full and two half Zinc electrodes were assembled in a case with the symmetrical configuration: ½ Zn Ni Zn Ni Zn Ni Zn Ni Zn Ni ½ Zn. The cell was filled with an electrolyte containing 20% KOH+1% LiOH. The expected capacity of the cell was 5.0 Ah.

Figure 2:
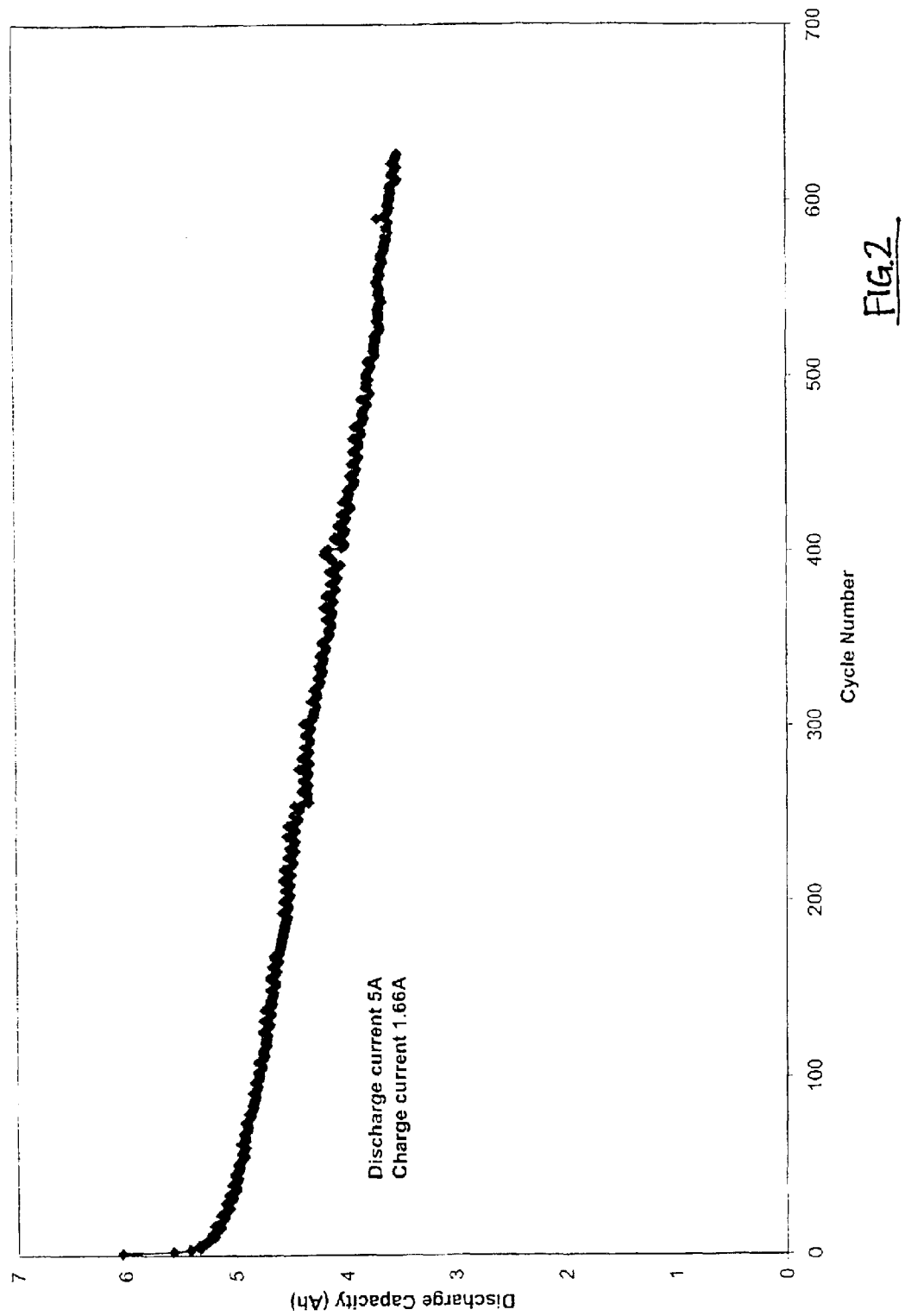
FIG. 2 of the drawing is a two dimensional plot showing discharge capacity as a function of cycle number for Experiment No. 1 (Nickel Zinc alkaline cell).

The cells were formed by the procedure described in U.S. application Ser. No. 10/056,782, filed on Jan. 23, 2002, the specification of which is incorporated herein by reference. The performance of the cells was measured by discharging them at 5A (1C rate) to 1.0V and charging at constant current of 1.67A (C/3 rate) to 2.03V followed by constant voltage charge at 2.03V till the current dropped to 0.555A. FIG. 2 shows the capacity as a function of cycle number. The initial capacity of the cell was 6.0Ah, and it had excellent rechargeability with 420 cycles obtained before the capacity dropped below 80% (4 Ah) and 626 cycles before the capacity reached 70% (3.5Ah) of the rated capacity.

As can be seen from this Example, the above-described method produces a toxicity-free cell having improved performance characteristics.

EXAMPLE 2

Figure 3:
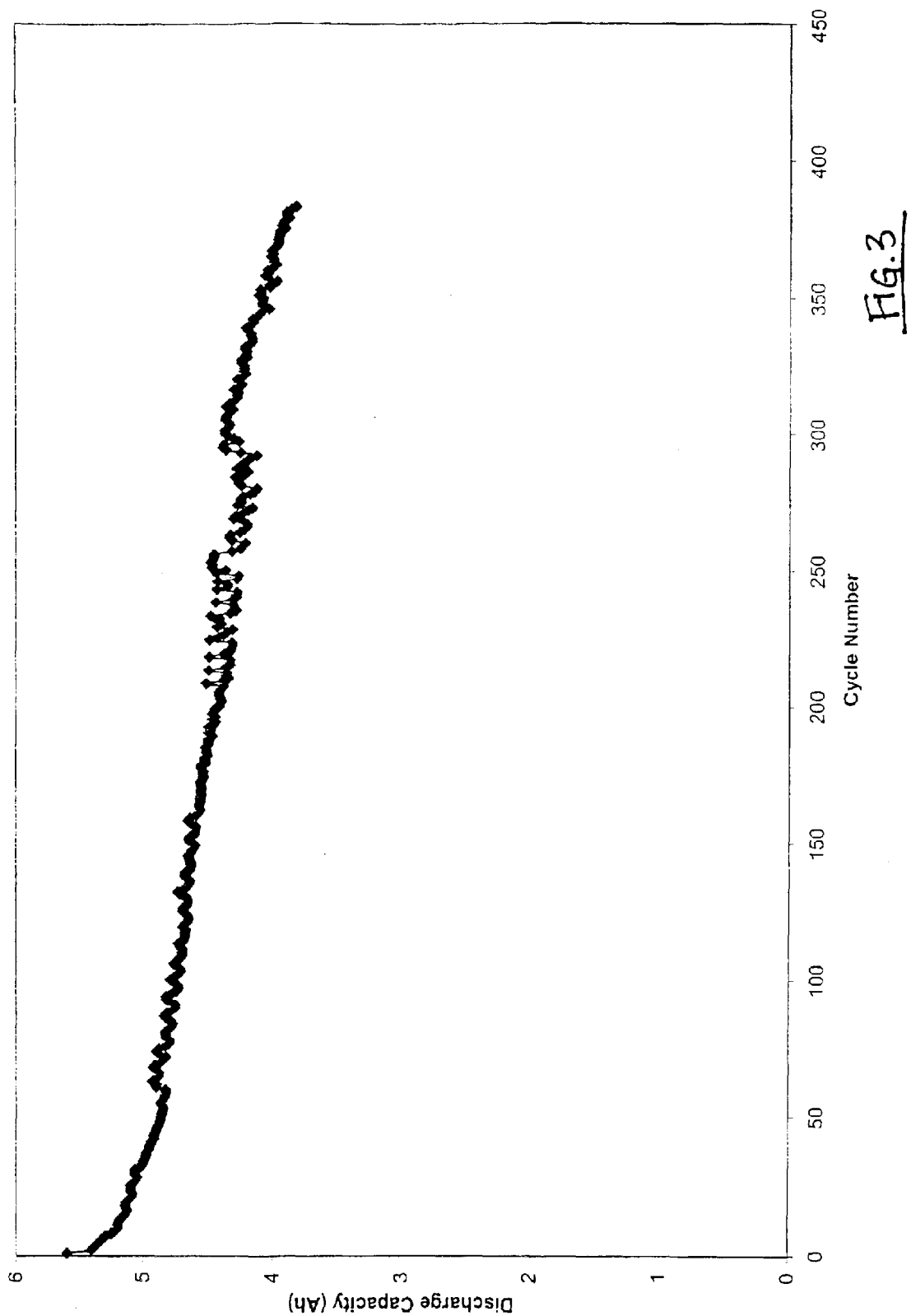
FIG. 3 of the drawing is a two dimensional plot showing discharge capacity as a function of cycle number for Experiment No. 2 (Nickel Zinc alkaline cell).

The above performance characteristics can best be understood by comparison to standard cells that utilize the undesirable toxic materials. To that end, zinc electrodes containing lead oxide were prepared according to the procedure described in U.S. patent application Ser. No. 10/006,793, filed on Dec. 12, 2001, the specification of which is incorporated herein by reference. The anode had the composition zinc 53.5%. Zinc oxide 27%, calcium hydroxide 12%, CMC 1%, lead oxide 4% and PTFE 2.5%. The electrodes were used in 5Ah Ni—Zn cells assembled as described in Example 1. The weights and thicknesses of the lead oxide containing electrodes were the same as those of the electrodes prepared according to the present invention. The cells went through the same formation procedure and were tested the same way. FIG. 3 shows the capacity as a function of cycle number. The initial capacity in this study was 5.5Ah and the cell reached 4Ah after 360 cycles.

The cell performance was therefore less than the performance of the cell shown in Example 1.

EXAMPLE 3

A large number of nickel-zinc cells have been assembled with heavy metal free zinc electrode of the present invention and zinc electrode containing lead oxide. The results are summarized in Table 1, which again shows the superiority of the rechargeable zinc electrodes prepared according to the present invention.

TABLE 1

Comparison of the performance of the Ni—Zn alkaline cells assembled with rechargeable zinc electrodes containing lead-oxide, and heavy metal free composition.

|  | Formulation containing lead | Heavy metal free formulation of present invention |
|---|---|---|
| No. of cells | 105 | 60 |
| Average Initial Discharge Capacity | 5.5 Ah | 6.1 Ah |
| Average Number of cycles to 4 Ah | 207 | 228 |

EXAMPLE 4

Figure 4:
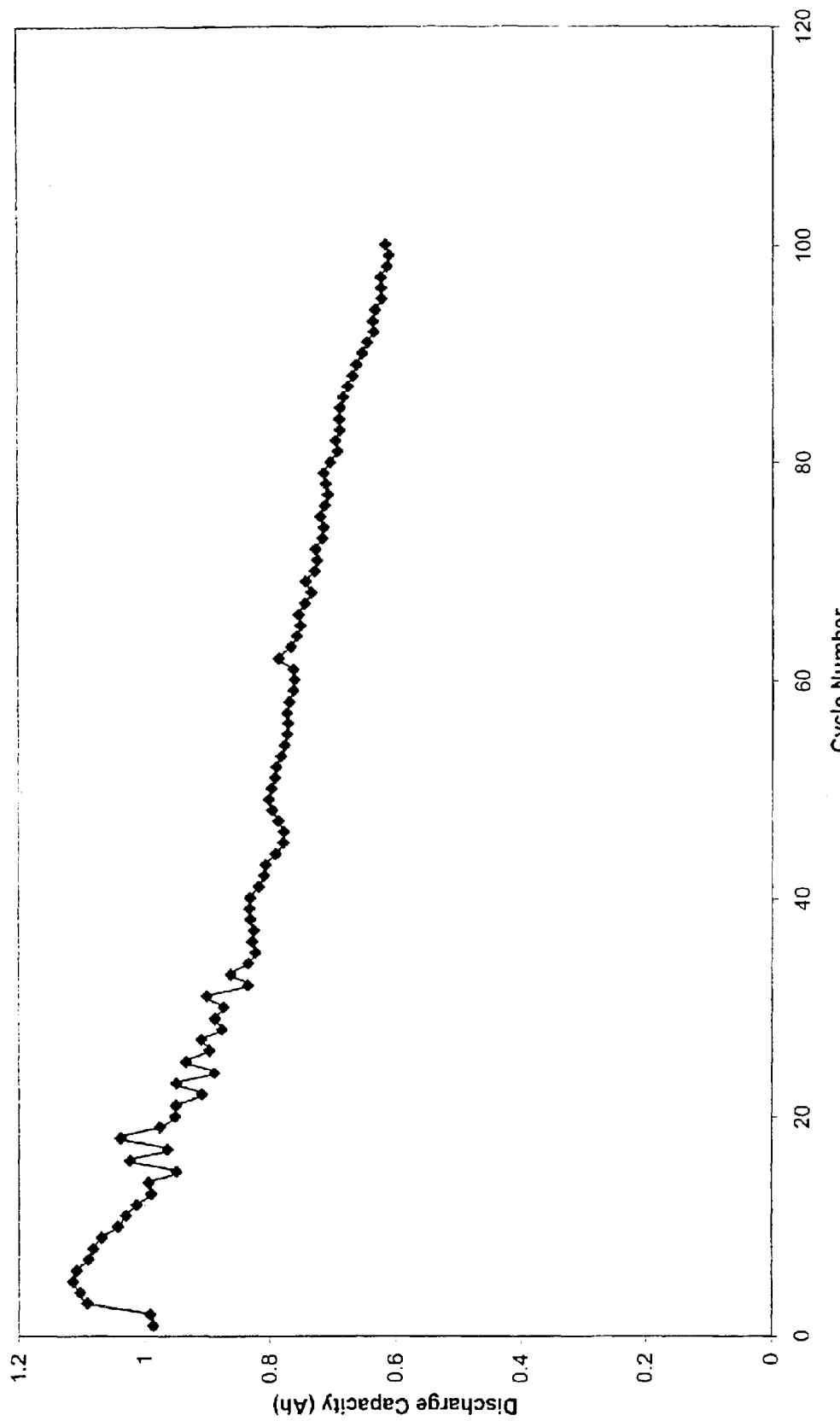
FIG. 4 of the drawing is a two dimensional plot showing discharge capacity as a function of cycle number for experiment No. 3 (Silver Zinc alkaline cell).

Increased cell performance may be achieved regardless of the particular formation procedure used also. To illustrate, zinc electrode sheets of present invention were made as described in Example 1. The sheet had the composition 30.5% zinc powder, 52.5% zinc-oxide. 12.0% Calcium-hydroxide, 0.10% indium hydroxide, 0.15% indium sulphate, 2.25% bismuth-oxide and 2.5% PTFE. They were pressed on to copper current collector and used in 1Ah silver zinc alkaline cell, without the benefit of the formation procedure described above. FIG. 4 shows the capacity as a function of cycle number. The cell cycled to 100 cycles with capacity above 60% of the rated capacity, showing the consistency of the cell efficacy, regardless of the particular procedure used.

EXAMPLE 5

Figure 5:
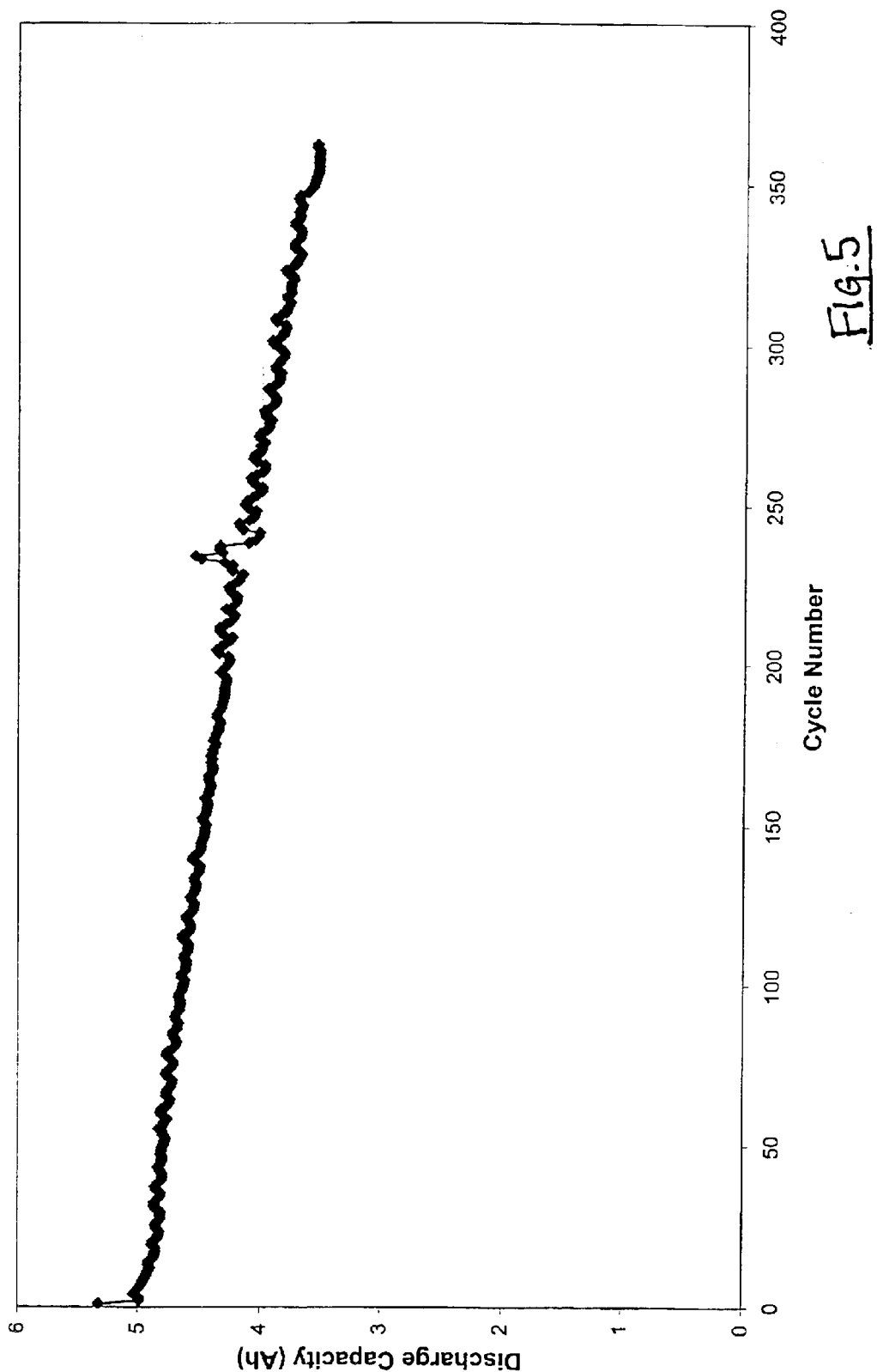
FIG. 5 of the drawing is a two dimensional plot showing discharge capacity as a function of cycle number for Experiment No. 4 (Nickel Zinc alkaline cell).

Finally, the effect of cell composition on the cell operation was investigated. Zinc electrode sheets of present invention were made as described in Example 1. The sheet had the composition 54.5% zinc powder, 27.5% zinc-oxide, 12.0% Calcium-hydroxide, 0.10% indium hydroxide, 0.15% indium sulphate, 2.25% bismuth-oxide and 2.5% PTFE. As can be seen the percentage amounts of zinc powder and zinc-oxide were altered, increasing the amount of zinc and decreasing the amount of zinc oxide relative to the cell in Example 1. The sheet was pressed on to copper current collector and used in Nickel-Zinc prismatic alkaline cell. FIG. 5 shows the capacity as a function of cycle number. The initial discharge capacity of the cell was ~5.3 Ah and the number of cycles to >4Ah was 260.

Examples 1 and 5 show that the electrode can be made with a wide range of compositions for Zinc and Zinc-oxide powders.

As the above examples illustrate, the present cell composition provides consistent-to-improved cell performances in charge retention, both initially and over numerous charge/discharge cycles, all while eliminating the need for toxic agents for hydrogen suppression and corrosion inhibition.

The foregoing description merely explains and illustrates the invention and the invention is not limited thereto except insofar as the appended claims are so limited, as those skilled in the art who have the disclosure before them will be able to make modifications without departing from the scope of the invention.

What we claim is:

1. A toxicity-free anodic electrode for use with alkaline electrolytes, comprising:
    a current collector;
    an active material composition applied to the current collector;
    a hydrogen gas and corrosion suppressant comprising indium hydroxide, indium sulphate, and bismuth oxide; and,
    a binding agent comprising poly-tetra fluoroethylene, and a zincate solubility modifier comprising calcium hydroxide, and wherein the active material comprises zinc and zinc oxide powders, the electrode comprising 20–60% zinc powder, 25–60% zinc oxide powder, 10–20% calcium hydroxide, 2–4% bismuth oxide, 0.1–0.5% indium hydroxide, 0.1–0.5% indium sulfate, and 1–5% poly-tetra fluoroethylene.

2. The electrode according to claim 1, wherein the electrode comprises 25–35% zinc powder.

3. The electrode according to claim 1, wherein the electrode comprises 45–55% zinc oxide.

4. The electrode according to claim 1, wherein the electrode comprises 10–15% calcium hydroxide.

5. The electrode according to claim 1, wherein the electrode comprises 2–3% bismuth oxide.

6. The electrode according to claim 1, wherein the electrode comprises 2–3% poly-tetrafluoroethylene.

7. A toxicity-free rechargeable alkaline electrochemical cell, comprising:
    a positive electrode and a negative current collector, with a separator therebetween, wherein the separator includes an alkaline electrolyte;
    an active material associated with the negative current collector;
    a hydrogen gas and corrosion suppressant comprising indium hydroxide, indium sulphate, and bismuth oxide; and,
    a binding agent comprising poly-tetra fluoroethylene, and a zincate solubility modifier comprising calcium hydroxide, and wherein the active material comprises zinc and zinc oxide powders, the electrode comprising 20–60% zinc powder, 25–60% zinc oxide powder, 10–20% calcium hydroxide, 2–4% bismuth oxide, 0.1–0.5% indium hydroxide, 0.1–0.5% indium sulfate, and 1–5% poly-tetra fluoroethylene.

8. The electrode according to claim 7, wherein the electrode comprises 25–35% zinc powder.

9. The electrode according to claim 7, wherein the electrode comprises 45–55% zinc oxide.

10. The electrode according to claim 7, wherein the electrode comprises 10–15% calcium hydroxide.

11. The electrode according to claim 7, wherein the electrode comprises 2–3% bismuth oxide.

12. The electrode according to claim 7, wherein the electrode comprises 2–3% poly-tetrafluoroethylene.

13. The electrode according to claim 7, wherein the positive electrode comprises nickel.

14. The electrode according to claim 7, wherein the positive electrode comprises silver.

* * * * *